(12) United States Patent
Despesse et al.

(10) Patent No.: US 8,760,032 B2
(45) Date of Patent: Jun. 24, 2014

(54) ENERGY RECOVERING DEVICE WITH A LIQUID ELECTRODE

(75) Inventors: Ghislain Despesse, Saint Egreve (FR); Yves Fouillet, Voreppe (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 171 days.

(21) Appl. No.: 12/809,733

(22) PCT Filed: Dec. 22, 2008

(86) PCT No.: PCT/EP2008/068182
§ 371 (c)(1),
(2), (4) Date: Jun. 21, 2010

(87) PCT Pub. No.: WO2009/083542
PCT Pub. Date: Jul. 9, 2009

(65) Prior Publication Data
US 2010/0295415 A1 Nov. 25, 2010

(30) Foreign Application Priority Data
Dec. 21, 2007 (FR) ...................................... 07 60221

(51) Int. Cl.
*H02N 1/00* (2006.01)
*H01G 7/00* (2006.01)

(52) U.S. Cl.
USPC ............. 310/309; 361/277; 361/284; 322/2 A

(58) Field of Classification Search
USPC ........... 310/300, 308, 309; 290/1 R; 361/277, 361/284–286, 327; 322/4, 2 A; 320/166, 320/167
See application file for complete search history.

(56) References Cited

U.S. PATENT DOCUMENTS

| 4,054,826 A | 10/1977 | Wahlstrom |
| 4,126,822 A | 11/1978 | Wahlstrom |
| 5,084,801 A * | 1/1992 | El-Hamamsy et al. ....... 361/277 |

(Continued)

FOREIGN PATENT DOCUMENTS

| EP | 1 564 879 A2 | 8/2005 |
| JP | 8-189453 | 7/1996 |
| RU | 2 241 300 C2 | 11/2004 |
| WO | WO 2010/034764 A1 | 4/2010 |

OTHER PUBLICATIONS

Machine Translation, Daiku et al, JP 08189453 A, Jul. 23, 1996.*

(Continued)

*Primary Examiner* — John K Kim
*Assistant Examiner* — Thomas Truong
(74) *Attorney, Agent, or Firm* — Oblon, Spivak, McClelland, Maier & Neustadt, L.L.P.

(57) ABSTRACT

An energy recovery device including: at least one capacitor with variable capacitance, the capacitor including a fixed electrode, a dielectric layer, and a liquid electrode; and a mechanism to inject an electric charge into the capacitor and to remove the electric charge therefrom, including a charge injection electrode forming a portion of the second face positioned upstream from the fixed electrode in the direction of displacement of the liquid electrode, and a charge removal electrode forming a portion of the second face positioned downstream from the fixed electrode in the direction of displacement of the liquid electrode.

18 Claims, 9 Drawing Sheets

(56) References Cited

U.S. PATENT DOCUMENTS

Figure 1A:
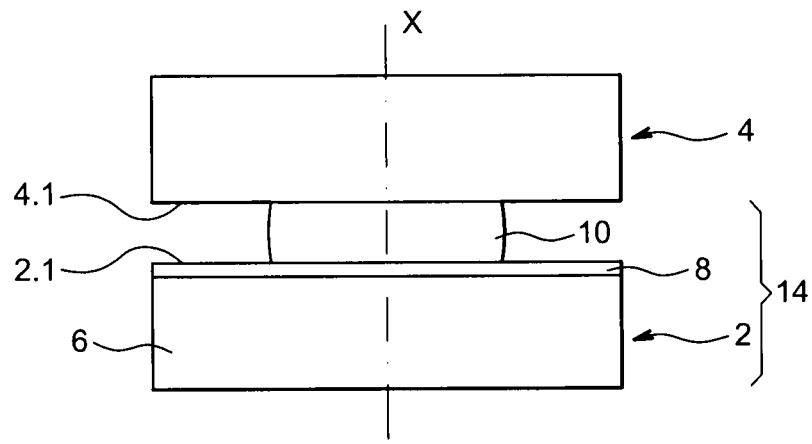

| | | | |
|---|---|---|---|
| 7,052,244 B2* | 5/2006 | Fouillet et al. | 417/48 |
| 7,132,614 B2* | 11/2006 | Beerling | 200/182 |
| 7,544,955 B2* | 6/2009 | Boutet | 250/459.1 |
| 7,781,935 B2 | 8/2010 | Jager et al. | |
| 7,898,096 B1 | 3/2011 | Krupenkin | |
| 7,965,016 B2* | 6/2011 | Despesse et al. | 310/319 |
| 2004/0007877 A1 | 1/2004 | Boland et al. | |
| 2006/0077762 A1 | 4/2006 | Boland et al. | |
| 2007/0007770 A1 | 1/2007 | Jager et al. | |
| 2007/0188046 A1 | 8/2007 | Chaillout et al. | |
| 2008/0089005 A1* | 4/2008 | Choi et al. | 361/278 |
| 2008/0192406 A1 | 8/2008 | Despesse et al. | |
| 2008/0238244 A1 | 10/2008 | Chaillout et al. | |
| 2010/0072859 A1 | 3/2010 | Jager et al. | |
| 2010/0133954 A1 | 6/2010 | Despesse et al. | |

OTHER PUBLICATIONS

Scott Meninger, et al., "Vibration-to-Electric Energy Conversion", IEEE Transactions on very large scale Integration (VLSI) Systems, vol. 9, No. 1, Feb. 2001, pp. 64-76.

G. Despesse, et al., "High Damping Electrostatic System for Vibration Energy Scavenging", NSTI-Nanotech 2005, vol. 3, 2005, pp. 371-374.

Yves Fouillet, et al., "Digital microfluidic design and optimization of classic and new fluidic functions for lab on a chip systems", Microfluid Nanofluid, 2007, 7 pages.

U.S. Appl. No. 13/120,805, filed Jun. 10, 2011, Despesse.

Office Action mailed Mar. 19, 2013, in Japanese Patent Application No. 2010-538795, filed Dec. 22, 2008 (with English-language Translation).

\* cited by examiner

ENERGY RECOVERING DEVICE WITH A LIQUID ELECTRODE

TECHNICAL FIELD AND PRIOR ART

The present invention relates to an energy recovering device applying at least one liquid electrode, more particularly to a device for converting mechanical energy into electrical energy.

It is known how to convert vibratory energy into electrical energy, for example from the document <<*Vibration-to-Electrical energy Conversion*>>, Scott Meninger, Jose Oscar Mur-Miranda, Rajeevan Amirtharajah, Anantha P. Chandrakasan, and Jeffrey H. Lang, in *IEEE Transactions on very large Scale Integration (VLSI) Systems*, Vol. 9, No. 1, February 2001. The latter describes an energy conversion device formed with a plurality of capacitors with variable capacitance. The device includes two interdigitated combs, one of which is fixed and the other one is mobile under the effect of vibration. A first plate of each capacitor is borne by a finger of a comb and a second plate is borne by a finger of the other comb facing the first plate. Thus, when the mobile comb moves, the air gap between the plates of each capacitor varies. Provision is further made for injecting a charge in each capacitor when their capacitance is maximum, i.e. when the air gap distance if minimum, and for recovering this charge when the capacitance is minimum, i.e. when the air gap distance is maximum. As the value of the capacitance decreases at constant charge, the voltage increases between the plates, there is therefore an increase in electrical energy, which is recovered when the capacitors are discharged. Therefore there is actually a conversion of vibrational energy into electrical energy. The recovered energy in a cycle of variation of the capacitance therefore corresponds to the difference between the energy under which the charge is removed and the energy under which it is injected.

These devices are relatively efficient; however they have a major drawback: the risk of contact between the plates. This contact may generate a short circuit on the one hand, and generate mechanical damping on the other hand, reducing the conversion efficiency of the device. Further, this contact may cause degradation of the device.

In order to avoid this contact, it is necessary to have rigid plates, in the particular case of the combs, very rigid fingers and almost perfect guidance which involves a bulky device.

Further, it is necessary to arrange for a large minimum safety air gap between the plates; now such an air gap reduces the maximum capacitance values which may be reached and, therefore the amount of energy which may be recovered at each cycle of capacitance variation.

Moreover, it is interesting to be able to recover the energy of moving liquids, for example the energy of raindrops. Now the devices described above do not allow such a recovery in a simple way, indeed provision would have to be made so that the drops set the mobile comb into motion, which would necessarily pose sealing problems, but would also provide reduced conversion yield.

Document U.S. Pat. No. 4,126,822 describes a mechanical energy conversion device used in a watch. This device includes a drop of mercury capable of moving in an electrically non-conductive liquid between one face through which it is biased and a second face formed by two adjacent fixed electrodes, the drop of mercury being insulated from both of these electrodes by a dielectric layer. The mercury drop therefore forms with each of the electrodes a capacitor with variable capacitance. The assembly is enclosed in a casing and the drop moves under the effect of the force of gravity. The mercury drop performs a reciprocal movement along both electrodes, causing a change in capacitance of the two capacitors with variable capacitance in a cyclic way. There are no steps for charging and discharging the drop of mercury. With this device it is not possible to recover energy of raindrops or of any other drops of liquid having unidirectional motion.

Therefore an object of the present invention is to provide an energy conversion device with improved efficiency for recovering energy, by suppressing the putting into contact between the plates of capacitors with variable capacitance.

DISCUSSION OF THE INVENTION

The object stated beforehand is reached by a device for converting mechanical energy into electrical energy including at least one capacitor with variable capacitance including a solid plate and a solid dielectric and a second plate, itself being formed by an electrically conductive liquid.

Thus, the risk of an electric contact between the plates is suppressed.

In other words, an electrical circuit is achieved, the electric capacitance of which depends on the position, on the presence or on the geometry of a liquid element, the liquid element being subject to mechanical forces causing modification of the capacitance of a capacitor, by which it is possible to convert mechanical energy into electrical energy by injecting and by removing an electric charge at given instants.

In an embodiment, the liquid plate is fixed and is maintained between the dielectric and a mobile part, the displacement of the mobile part causing a deformation of the plate and therefore a modification of the surface area facing the plates, and therefore a modification of capacitance. In this embodiment, the wettability and the hysteresis for wetting the dielectric are used in order to have a reproducible and reversible variation of the surface area of the liquid in contact on the dielectric.

In other embodiments, the liquid plate in mobile and is renewed at each capacitance variation cycle, for example in the case of recovering energy from the fall of raindrops. In these embodiments, the conversion device includes an area for charging the liquid drop located upstream from the fixed plate and an area for discharging the liquid drop located downstream from the fixed plate.

Notably, in a second embodiment, the device includes an insulated fixed electrode and an electronic system capable of managing the injection and removal of the charge, by detecting the maximum capacitance for charging the liquid, and the minimum capacitance for removing the charge from the liquid.

In a third embodiment, the device includes an electrically insulated electrode and two non-insulated electrodes, the arrangement of the non-insulated electrodes being such that it provides automatic charge injection and removal by simple electric contact, without requiring from the electronic system, injection and removal management.

The first non-insulated electrode is placed in proximity to the insulated electrode and is capable of imposing an electric potential to a liquid when the liquid is in proximity to the insulated electrode, the second non-insulated electrode is capable of being in contact with the liquid when the latter is moved away from the insulated electrode. An electric circuit is associated with the system for applying a potential difference between the insulated electrode and the first non-insulated electrode on the one hand and, for discharging the capacitor formed by the liquid and the insulated electrode when the liquid comes into contact with the second non-insulated electrode.

The subject-matter of the present invention is then mainly a device for recovering energy, including at least one capacitor with variable capacitance, said capacitor comprising a single fixed electrode, a dielectric layer and at least one liquid electrode, and means capable of injecting an electric charge into the liquid electrode and of removing it therefrom.

In a first embodiment, the device may include a mobile element positioned opposite to the fixed electrode relatively to the dielectric layer and capable of moving away from and moving closer to the fixed electrode, the liquid electrode being interposed between the dielectric layer and the mobile element, the liquid electrode being deformed by the displacement of the mobile element, this deformation allowing amplification of the capacitance variation of the capacitor.

The mobile element is advantageously electrically conductive for injecting an electric charge into the liquid electrode and removing it therefrom, which simplifies the making of the device.

The device may for example include a fixed comb provided with fingers and forming the fixed electrodes and a mobile comb provided with fingers forming a plurality of mobile elements interposed between the fingers of the fixed comb, the fingers of the fixed comb being covered with the dielectric layer, a liquid electrode being introduced between a finger of the fixed comb and a finger of the mobile comb.

The means capable of injecting an electric charge into the capacitor and of removing it therefrom notably include means for determining the instant when the capacitance of the capacitor is maximum and the instant when the capacitance is minimum, and means for injecting and removing the electric charge at these instants respectively.

In other embodiments, the liquid electrode is mobile along a direction parallel to the fixed electrode.

The means capable of injecting an electric charge into the liquid electrode may be positioned upstream from or facing the fixed electrode, and the means capable of removing an electric charge from the liquid electrode are positioned downstream from the fixed electrode.

In a second embodiment, the means for injecting an electric charge into the electric electrode and for removing it therefrom are connected through a conductive wire. For example, the device includes a wall in a dielectric material, the fixed electrode on a first face of this wall, the liquid electrode being capable of moving on a second face opposite to the first face, and in which the electric charge injection and removal means include a wire tensioned along the second face of the wall, means for determining the instant when the capacitance of the capacitor is maximum and the instant when the capacitance is minimum, and means for injecting and removing the electric charge at these instants respectively.

In a third embodiment, the means for injecting and removing an electric charge include a charge injection electrode forming a portion of the second face positioned upstream from the fixed electrode in the direction of displacement of the liquid electrode, and a charge removal electrode forming a portion of the second face positioned downstream from the fixed electrode in the direction of displacement of the liquid electrode.

In the case when the liquid electrode moves under the action of the force of gravity, it may be provided that the wall should be substantially planar and tilted.

In the case when the mobile electrode moves under the action of a pressure force, it may be provided that the wall should be cylindrical and form a channel, the second face being the inner face of the channel, the injection electrode being substantially at the fixed electrode or substantially upstream, so as to allow injection of the charge when the liquid electrode is facing the fixed electrode.

The channel is for example intended to be connected to a source of pressurized liquid drops, said drops being intended to form the liquid electrodes.

In another exemplary embodiment, the device includes at least one injection electrode substantially facing or slightly upstream from the fixed electrode covered with the dielectric layer, defining with the fixed electrode an air gap for letting through the liquid electrode, and a charge removal electrode positioned downstream from said air gap in the direction of the displacement of the liquid electrode. Advantageously, this device includes a plurality of injection electrodes and a plurality of inserted fixed electrodes forming a plurality of air gaps, the removal electrode extending substantially orthogonally to the direction of the displacement of the mobile electrode and is in front of the plurality of air gaps.

The position of the removal electrode relatively to the fixed electrode is advantageously selected so that the capacitance of the capacitor is minimum, when the liquid electrode is at the removal electrode.

The dielectric layer advantageously has hydrophobic properties relatively to the liquid of the electrode.

In another embodiment, the energy recovery device according to the invention is intended for recovering the energy of waves of an expanse of water, the waves forming the liquid electrode, including a plurality of fixed electrodes covered with a dielectric layer and positioned side by side defining passages for the waves, and a plurality of injection electrodes each associated with a fixed electrode positioned on the dielectric layer of the fixed electrode so that the tops of the waves move away from and move closer to the injection electrode while moving along the fixed electrode, the device also including an electric contact point with the expanse of water. The device may include electronic biasing systems capable of applying an electric potential between at least one fixed electrode and at least the associated injection electrode.

The subject-matter of the present invention is also a system for recovering energy including at least two energy recovery devices according to the present invention, said devices being associated so as to convert a maximum amount of energy.

The subject-matter of the present invention is also a method for converting mechanical energy into electrical energy applying the device according to the present invention, including the steps of:
  applying mechanical action on the liquid electrode so as to vary the capacitance between the liquid electrode and the fixed electrode,
  measuring the capacitance of the capacitor and detecting the instants when the capacitance is maximum and minimum,
  injecting a charge when the value of the capacitance is maximum,
  removing the charge when the value of the capacitance is minimum, and recovering the generated electrical energy.

The determination of the instant when the capacitance of the capacitor is maximal and of the instant when the capacitance is minimal may be obtained by injecting a residual charge into the capacitor and measuring the potential difference between the fixed electrode and the liquid electrode.

The subject-matter of the present invention is also a method for converting mechanical energy into electrical energy applying the device according to the present invention, including the steps of:

applying a mechanical action on the liquid electrode so as to vary the capacitance between the liquid electrode and the fixed electrode, applying a given bias voltage between the fixed electrode and the injection electrode, injecting the charge by contact between the liquid electrode and the injection electrode, removing the charge and recovering the generated electrical energy by contact with the removal electrode.

It is then provided that the charge should be injected when the drop is located upstream or substantially facing the fixed electrode and that the charge should be removed when the drop is located downstream from the fixed electrode.

These methods advantageously include a preliminary step for selecting the bias voltage so that the velocity of the liquid electrode is close to zero at the removal electrode.

SHORT DESCRIPTION OF THE DRAWINGS

Figure 1B:
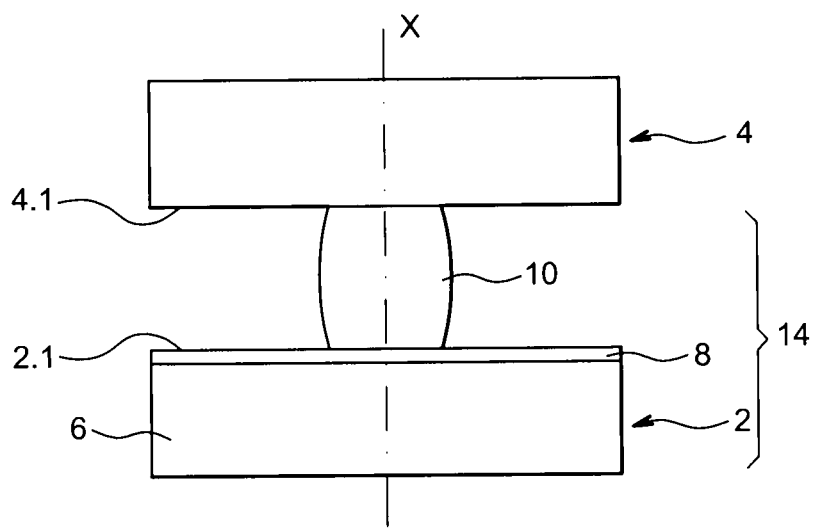
Figure 1B:
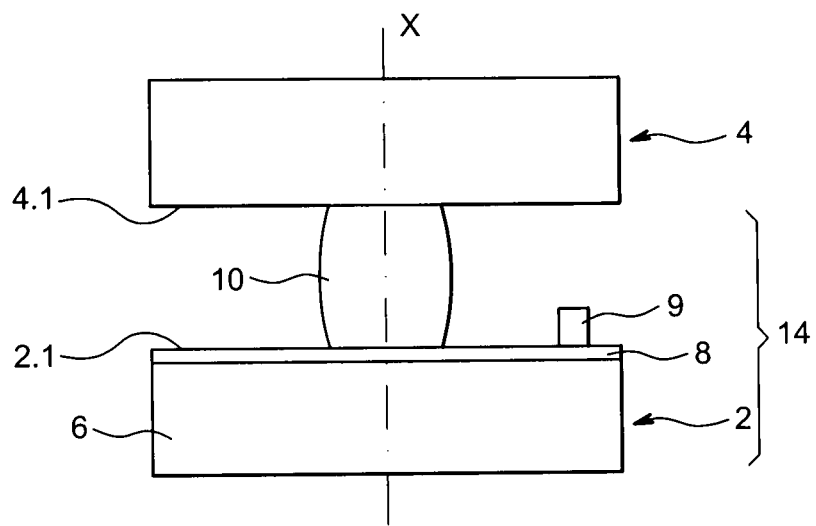
Figure 1C:
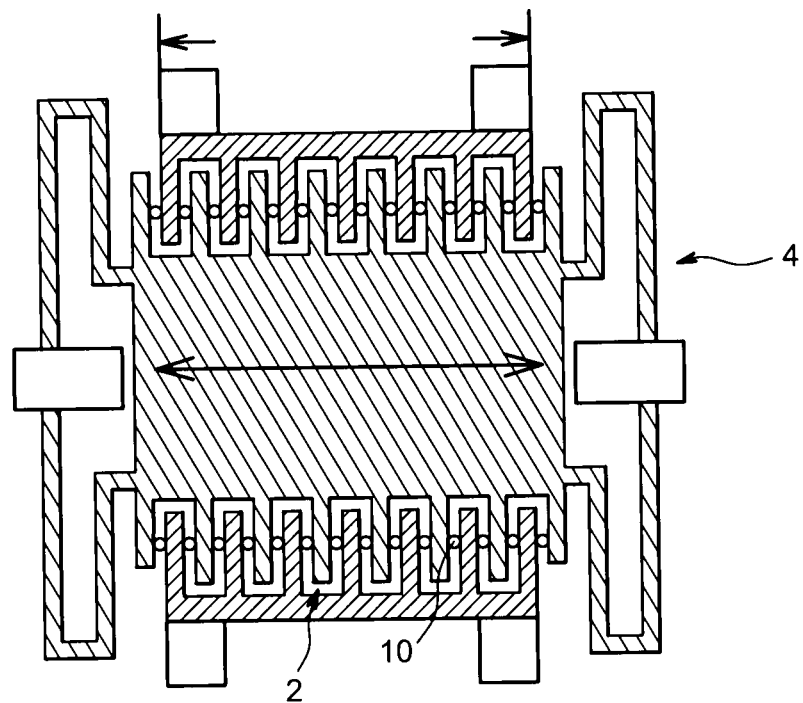
Figure 1D:
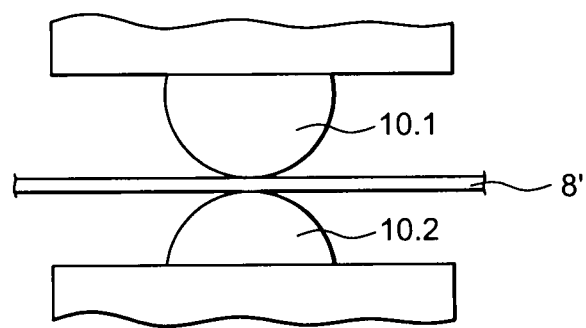
Figure 2:
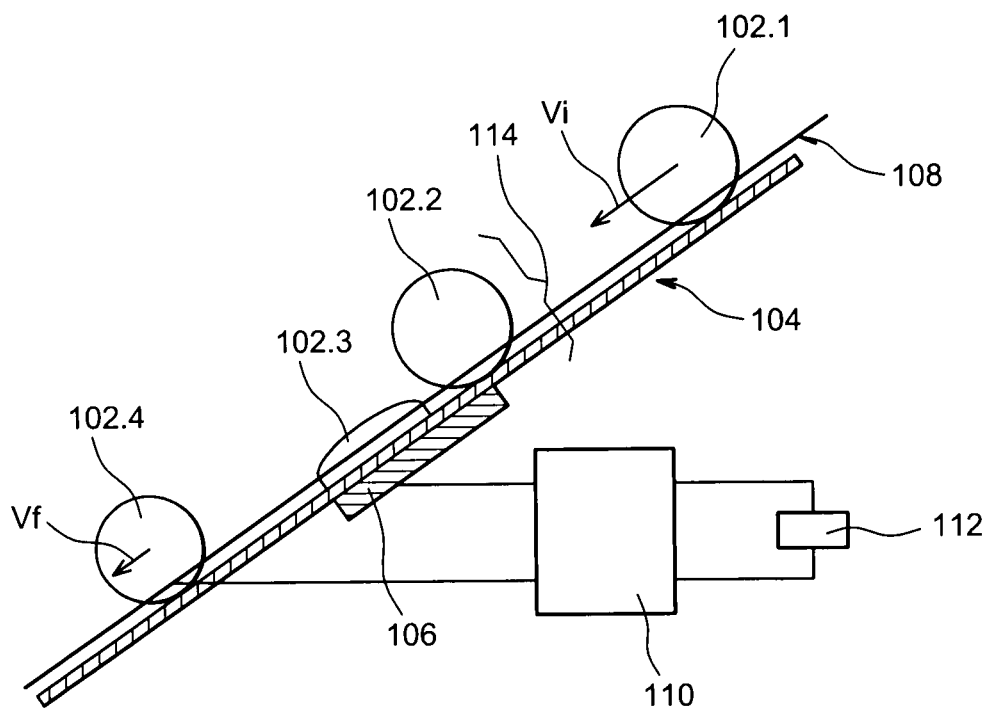
Figure 3:
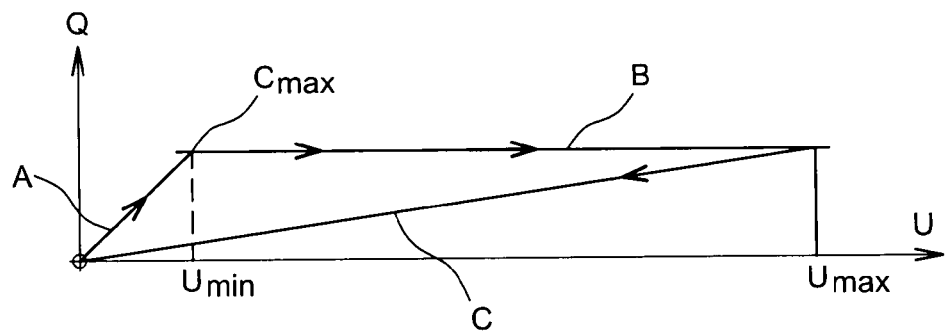
Figure 5:
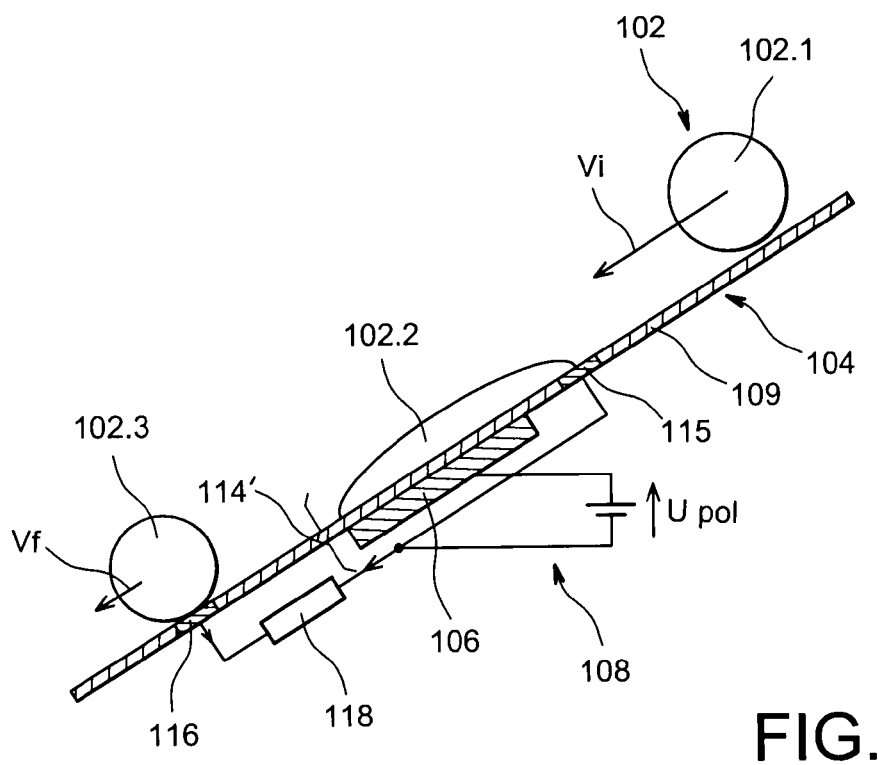
Figure 6A:
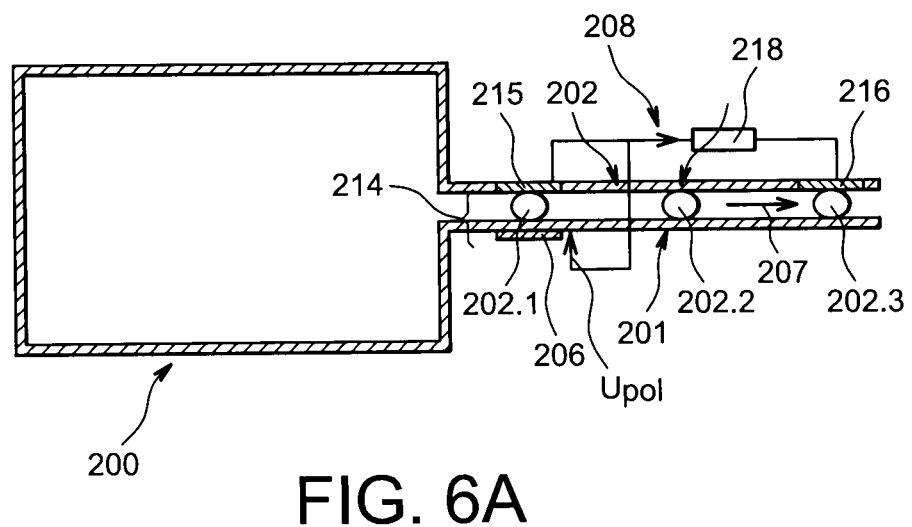
Figure 6B:
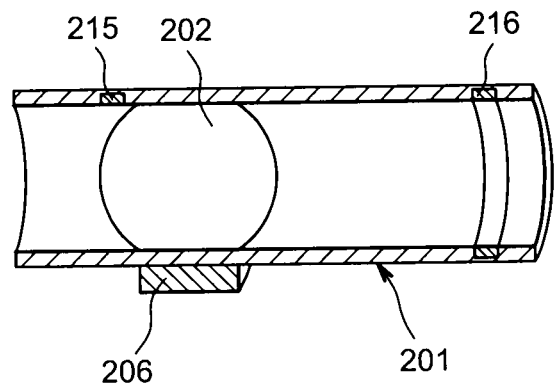
Figure 7:
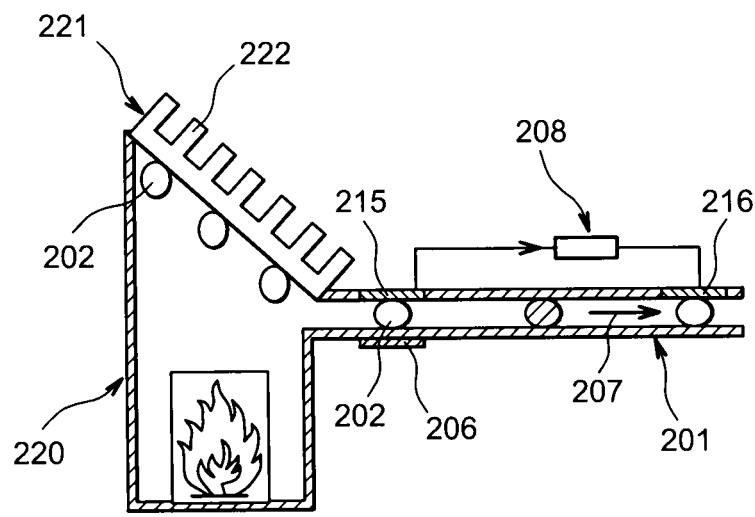
Figure 8:
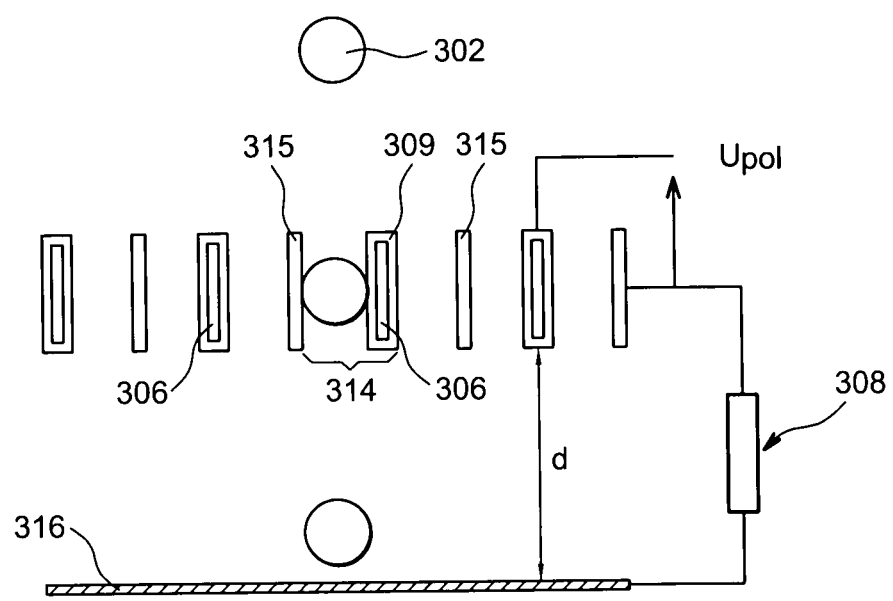
Figure 9:
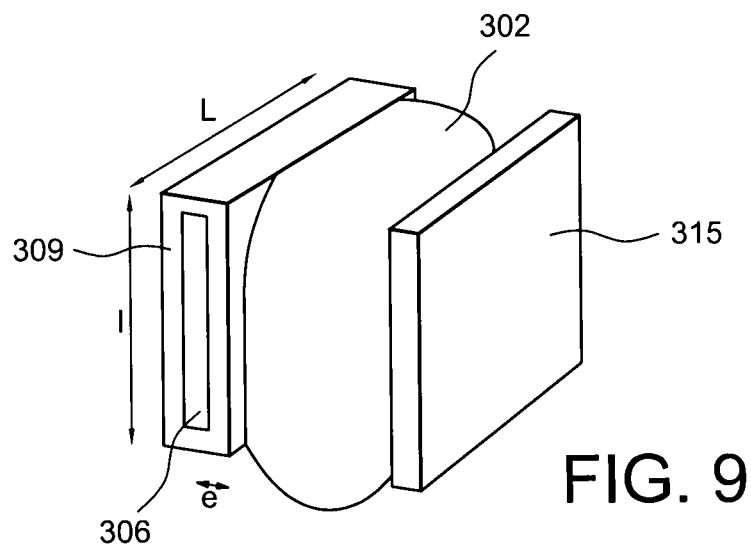
Figure 10:
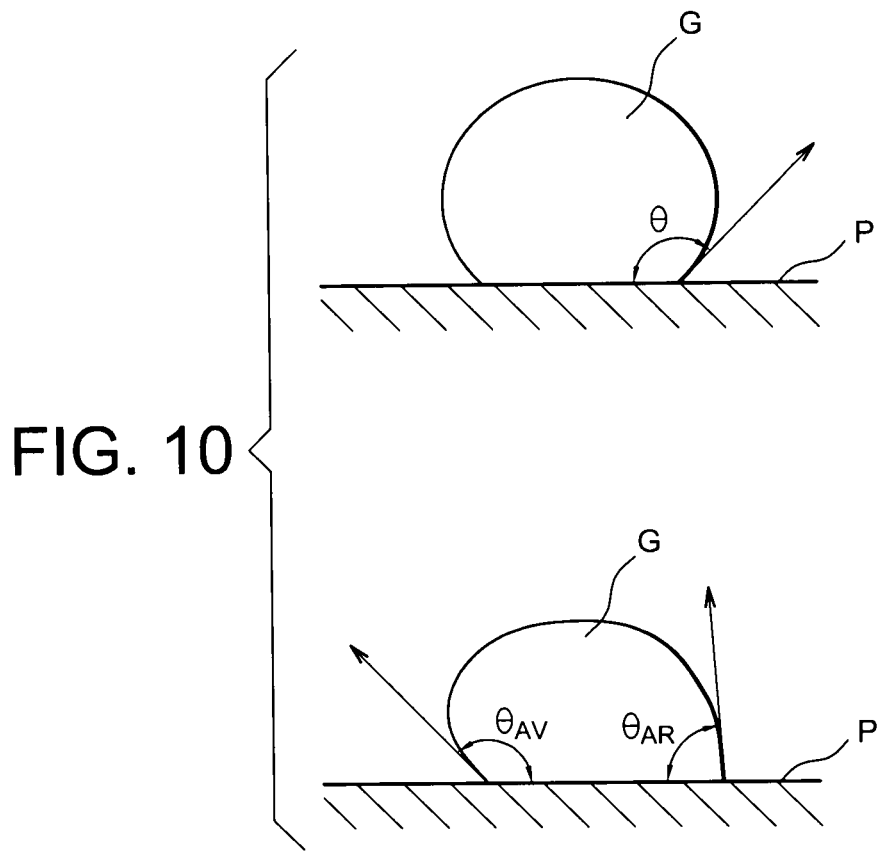
Figure 11:
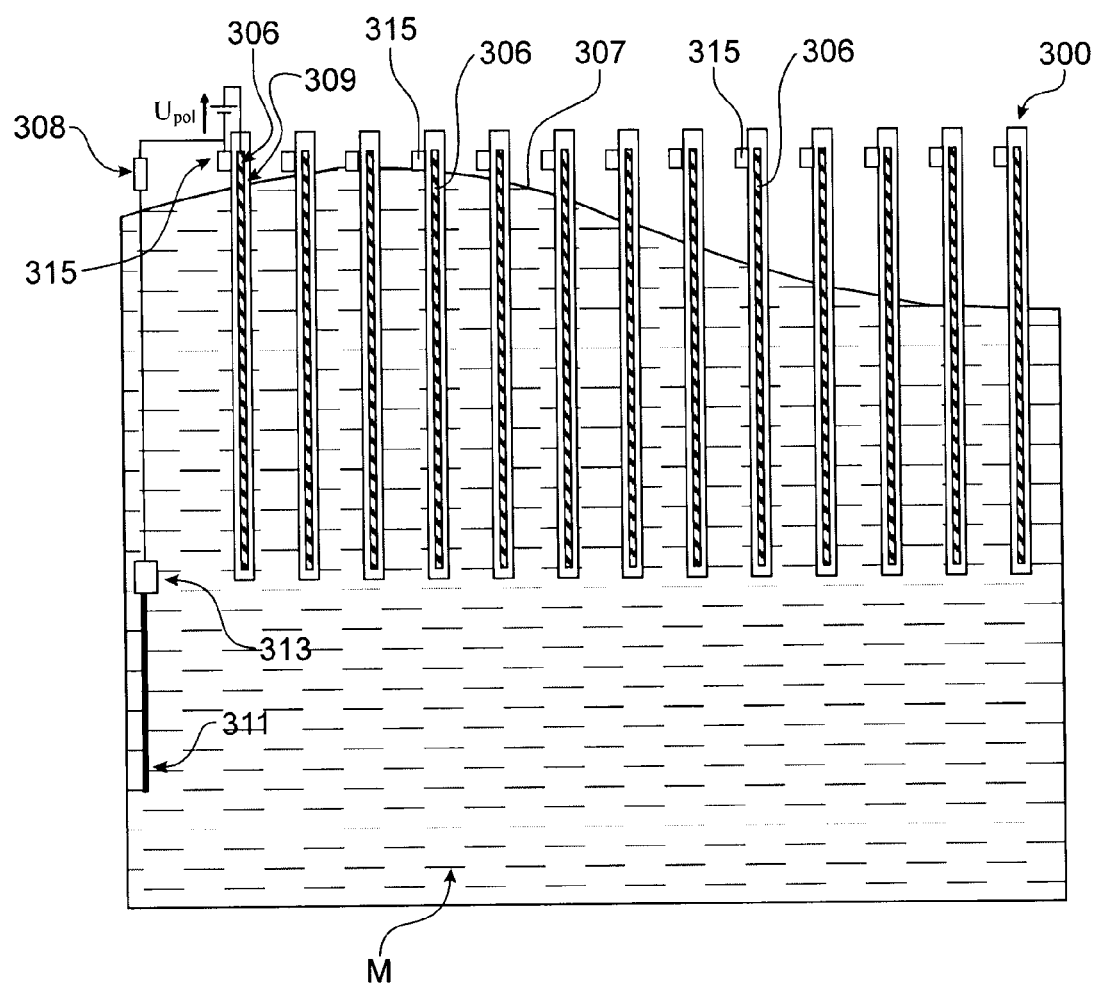

The present invention will be better understood by means of the description which follows and of the appended drawings wherein:

FIGS. 1A and 1B are schematic longitudinal sectional views of a first embodiment of the present invention in a state of maximum capacitance and in a state of minimum capacitance, respectively, FIG. 1B' is a schematic longitudinal sectional view of an alternative of the device of FIG. 1B, FIG. 1C is a schematic illustration of an energy recovery device applying the first embodiment of the invention of FIGS. 1A and 1B, FIG. 1D is an alternative embodiment of FIGS. 1A and 1B, wherein both electrodes are liquid, FIG. 2 is a schematic side view of an example of a second embodiment of the present invention, FIG. 3 is a graphic illustration of an electric operating cycle of the device of FIG. 2, FIGS. 4A-4C are graphic illustrations of the change of the capacitance according to the present invention versus time, of the charge versus time and of the voltage versus time, respectively, FIG. 5 is a schematic side view of a first alternative of a third embodiment of the present invention, FIG. 6A is a schematic side view of a second alternative of the third embodiment of the present invention, FIG. 6B is a detailed view of another exemplary embodiment of the device of FIG. 6A, FIG. 7 is a schematic sectional view of an exemplary source of drops of the device of FIG. 6A, FIG. 8 is a schematic illustration of a third alternative of the third embodiment, FIG. 9 is a detailed view of FIG. 8, FIG. 10 schematically illustrates a drop on a plane and the angles characterizing hydrophobicity;

FIG. 11 is a schematic illustration of the device according to the invention capable of recovering wave energy.

DETAILED DISCUSSION OF PARTICULAR EMBODIMENTS

In FIGS. 1A and 1B, a first embodiment may be seen of an energy conversion device according to the present invention including a fixed element 2 and a mobile element 4, both elements 2, 4 including substantially planar faces 2.1, 4.1 respectively facing each other, the face 4.1 being intended to move closer to the face 2.1 and to move away from it. For this purpose, the mobile portion 4 is capable of moving along an axis X substantially orthogonal to the faces 2.1, 4.1.

The fixed element 2 includes a base 6 in an electrically conductive material in order to be used as an electrode or a plate for a capacitor, and an insulating electrical material layer and, preferably with strong electric permittivity 8, deposited on one face of the base 6 so as to form the planar face 2.1.

According to the present invention, an electrically conductive liquid element 10 is introduced between the fixed element 2 and the mobile element 4, more particularly between the dielectric layer 8 and the planar face 4.1.

The base 6, the dielectric layer 8 and the liquid element 10 form a capacitor 14, for which the value of the capacitance may vary, the liquid element 10 forming an electrode or plate with variable shape.

The liquid element 10, which for example is a drop of water, is deformable by displacement of the mobile element 4. Indeed, when the mobile element moves closer to the fixed element, the drop of water is squeezed, its contact surface area with the dielectric layer is therefore increased; when the mobile element moves away from the fixed element 2, the drop of water is stretched, reducing its contact surface area with the dielectric layer 8.

Therefore, the capacitor 14 is a capacitor with variable capacitance which varies with the displacement of the mobile portion, more particularly with the deformation of the drop 10.

Indeed, by considering the relationship (1) below, it is seen that the capacitance of a capacitor depends on the surface area of the electrodes facing each other:

$$C = \frac{\varepsilon_0 \varepsilon_r S}{d} \tag{1}$$

$\varepsilon_0$ being vacuum permittivity, $\varepsilon_r$ being the relative permittivity of the dielectric, S being the surface area of the facing electrodes, and d being the distance between the electrodes.

d is constant and is given by the thickness of the dielectric layer 8, and S varies depending on the shape of the drop 10, more particularly depending on the shape of the interface between the drop and the dielectric layer 10.

In FIG. 1A, the facing surface Smax is maximum, the capacitance is therefore maximum.

In FIG. 1B, the facing surface Smin is minimum, the capacitance is therefore minimum.

We shall recall below the principle for recovering energy with an electrostatic system.

This recovery is carried out by conversion of mechanical energy, such as that of displacement or vibration, into electrical energy by means of one or more capacitors with variable capacitance.

The change in capacitance is usually obtained by relative displacement of the solid electrodes of the capacitors, or as we indicated earlier, risks of contact between electrodes are significant.

Conversion is carried out as follows:

when the capacitance is maximum, a given charge is injected into the capacitor, when the capacitance is minimum because of the distance between the electrodes, this charge is recovered for which the energy is increased by this reduction of capacitance at constant charge.

Indeed, in a capacitor, the relationship between the charge (Q), the capacitance (C) and the voltage (V) between the electrodes is the following:

$$Q = C \times V \quad (2), \text{ and}$$

the energy is given by the following relationship:

$$E = \frac{1}{2}QV = \frac{1}{2}\frac{Q^2}{C}, \quad (3)$$

A reduction of the capacitance at constant charge therefore causes an increase in the voltage V, and therefore an increase in the energy E.

The electrostatic system according to the present invention replaces the solid mobile electrode with a liquid electrode in contact with the dielectric, the risks of the contacts stated earlier are therefore eliminated.

By <<liquid>>, is understood in the present application, a material for which the viscosity allows its flow under pressure or under gravity: typically this material includes a viscosity less than or equal to that of water, which is equal to 1 centipoise. However, a material for which the viscosity is greater, up to several hundred centipoises, may be used. The volume of the liquid electrodes is for example comprised between 10 µl and 1 ml.

Advantageously, it is provided that the charge should be brought into the liquid element 10 by the mobile element 4, in this case, the latter is made in an electrically conductive material. The mobile element 4 is connected to an electronic system (not shown) for managing the injection and recovery of the charge.

In FIG. 1B', an alternative embodiment of the conversion device of FIG. 1B may be seen, in which the injection of the charge into the drop is performed by means of an electrode 9 positioned on the dielectric layer 8 at a distance from the X axis so that the drop will come into contact with the injection electrode 9 when it attains a sufficiently deformed state, corresponding to maximum capacitance of the capacitor, i.e. when the drop has a maximum surface area facing the fixed electrode 6. This alternative has the advantage of allowing automatic injection of the charge when the capacitance of the capacitor is maximum, without having to monitor the shape of the drop.

An independent electric conductor crossing the drop may also be provided, or simply in contact with the drop of liquid and connected to the electronic system.

The mobile element 4 is for example displaced by vibrations of the system supporting it or by intermittent forces.

Determination of the maximum and minimum values of the capacitance of the capacitor 10 may be achieved, for example by means of a position sensor detecting the extreme positions of the mobile element, or by permanently applying a residual charge to the capacitor and by measuring the potential difference between the electrodes, when the value of the latter is maximum, the value of the capacitance is minimum and vice versa.

Advantageously, the material of the dielectric layer 8 provides hydrophobicity and low wetting-unwetting hysteresis with regard to the liquid element; the frictions may then be considerably reduced between the liquid element 10 and the dielectric layer 8, thereby reducing the energy losses by friction and improving the yield of the energy recovery.

Hydrophobicity may be characterized by:
the wetting angle θ,
the wetting hysteresis which corresponds to the difference Δθ between the advanced angle $\theta_{AV}$ and the receded angle $\theta_{AR}$ of the drop when the latter moves.

These angles are illustrated in FIG. 10, on which a drop G may be seen on a surface P.

Advantageously, for applying the present invention, it is sought to have a wetting angle θ greater than 90°, and a difference Δθ of less than 10°. For example a material is selected with θ=110° and Δθ=5°, such as Teflon or silicon oxycarbide (SiOC).

In the example illustrated in FIGS. 1A and 1B, a single capacitor is illustrated. It is well understood that the present invention may apply to energy recovery devices of the comb type as illustrated in FIG. 1C, a liquid element being introduced between each pair of fingers. Devices for which the distance between the fingers is greater may then be made, improving the recovery efficiency: with the dielectric it is possible to avoid contacts and with the liquid electrode it is possible to fit the shape of the fingers and thereby increase the capacitance.

Having two liquid electrodes as illustrated in FIG. 1D, may also be contemplated, both liquid electrodes 10.1, 10.12 being separated by a dielectric 8'. Two operating modes may be contemplated for varying the air gap: either by bringing both liquid electrodes 10.1, 10.2 closer to each other by applying a mechanical force, or by stretching the dielectric 8' which in this case is made as a flexible film, this stretching causing thinning of the film and therefore a reduction of the air gap, i.e. d in the relationship (1), which causes an increase in the capacitance of the capacitor according to the relationship (1). Further, the stretching of the film causes spreading of the liquid electrodes 10.1, 10.2 and therefore an increase in the facing surface area S, which also generates an increase in the capacitance of the capacitor according to the relationship 1.

In FIG. 2, an example of a second embodiment of the present invention may be seen, wherein the variation of capacitance is obtained by displacing a liquid element.

In the example illustrated, it is desired to recover the kinetic energy and the potential energy of a liquid drop 102 flowing along a tilted plane 104.

This device includes a fixed electrode 106, fixed on one face of the tilted plane 104 opposite to the one with which the drop of liquid 102 comes into contact.

The tilted plane is made in an electrically insulating material advantageously with high permittivity 109, this material therefore electrically insulates the fixed electrode 106 from the drop 102, at least at the fixed electrode 106. This plane advantageously has a strongly hydrophobic surface and with low wetting hysteresis, which allows reduction of friction losses.

The device also includes an electric conductor 108 in the form of a tensioned filament above the tilted plane and following its slope.

The device also includes an electronic management system 110 intended to inject and recover the charge and to transfer the converted energy towards a storage area 112. The charge is injected into the drop when the latter is located upstream from the fixed electrode 106 and the charge is removed from the drop when it is located downstream from the fixed electrode.

For this purpose, the electronic system 110 is electrically connected to the fixed electrode 106 and to the filament 108 and is capable of applying a bias voltage between the fixed electrode 106 and the filament. Further, the injection and the removal of the charge are carried out by means of the filament 108, for this the electronic system includes means capable of injecting and of removing the charge when the capacitance of the capacitor 114 is maximum and minimum, respectively.

The electronic system 110 includes means for determining when the capacitance of the capacitor 114 has a maximum value and a minimum value, in order to inject and remove the charge at the right time, respectively.

For example, the electronic system 110 may provide permanent application of a residual charge to the capacitor 114 and measurement of the potential difference between the fixed electrode 106 and the drop 102; the value of the capacitance being a minimum, when the value of the potential difference is maximum, and vice versa.

The drop of liquid 102, when it moves on the plane 104, is in contact with the filament 108 and forms a mobile electrode relatively to the fixed electrode 106. The assembly of the fixed electrode 106, dielectric 109, filament 108 and drop of liquid 102 therefore forms a capacitor with variable capacitance 114.

In FIG. 2, several drops of liquid are illustrated, the latter in fact represent the same drop of liquid at several successive instants. In order to locate the position of the drop in time, reference 102.1 represents the drop in its chronologically earliest position and reference 102.4 designates the drop in its most belated position, references 102.2 and 102.3 designate the drop in intermediate positions at intermediate instants.

We shall now explain the operation of this device by using the graphs illustrated in FIGS. 3 and 4A-4C.

The drop 102.1 moves along the plane 104 due to gravity, this drop moves at an initial velocity Vi, this velocity tends to increase.

Figure 4A:
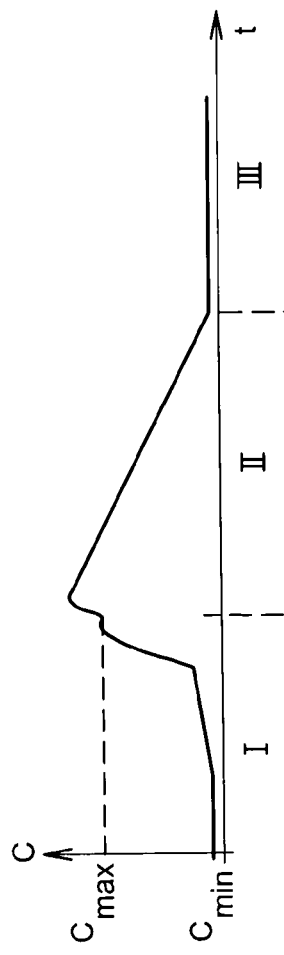

The capacitance of the capacitor 114 gradually increases as the drop moves closer to the fixed electrode 106, as this is illustrated on the first area I of FIG. 4A. The capacitance of the capacitor 114 increases until it reaches a value designated as $C_{max}$ at the end of the area I. As this may be seen, the maximum capacitance is reached at the beginning of the area II when the drop is squeezed, however the charge is injected at the end of the area I so that the drop under the effect of the charge flattens on the plane 104 facing the fixed electrode 106 as this will be explained below.

Figure 4B:
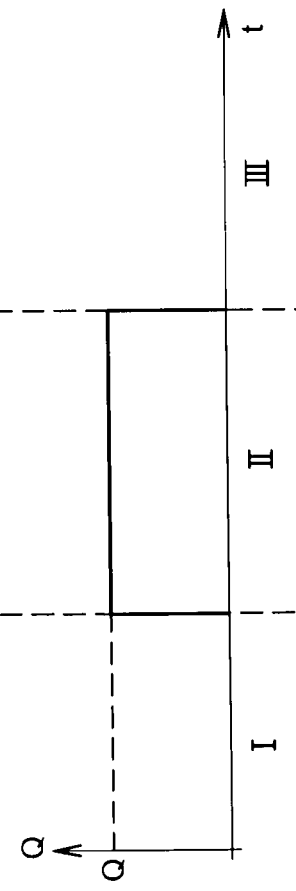
Figure 4C:
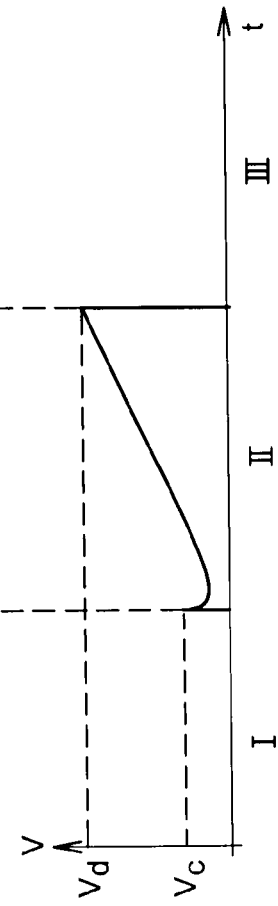

When the drop 102.2 arrives opposite to the fixed electrode 106, a determined charge Q is injected into the drop 102.2 by the electronic system 110 via the filaments 108, as this is visible on the second area II of FIG. 4B. The charge energy at that instant is minimum. Upon charging the drop 102, a current flows from the fixed electrode towards the charging electrode formed by the filament.

The charge Q causes an attraction between the drop 102.3 and the fixed electrode 106, which deforms and flattens along the plane 104, the capacitance is then maximum (FIG. 4A) since the facing surface area is maximum because of the relationship (1). A slowing down of the drop follows. The drop 102.4 however continues its displacement along the plane 104, causing a reduction in the capacitance of the capacitor 114, (FIG. 4A, area II). The braking energy is then converted into electrical energy via an electric potential increase (considering the relationship (2) and (3)) between the drop 102.3 and the fixed electrode 106, as this is visible at the area II of FIG. 4C, in which the voltage change versus time is illustrated, $V_c$ being the voltage during the injection of the charge and $V_d$ being the voltage upon removing the charge. Let US recall that the recovered energy is directly proportional to the difference $V_d - V_c$.

When this energy reaches its maximum, which occurs when the capacitance is minimum ($C_{min}$) (visible at the end of the area II in FIGS. 4A and 4C), the energy $V_d$ stored in the capacitance formed by the drop and the fixed electrode 106 is recovered and collected, either directly towards a device requiring this energy, or towards the storage area 112 as this is illustrated, for example a battery or a capacitance. During the discharge of the drop, a current flows from the discharge electrode formed by the filament towards the fixed electrode.

The velocity $V_f$ of the drop at the bottom of the slope is therefore lower than the velocity which it would have had in the absence of the energy recovery device.

In FIG. 3, the area A corresponds to the injection of the charge Q into the drop, the area B corresponds to the conversion of mechanical energy into electrical energy at constant charge, the capacitance decreases while the potential difference between the drop and the fixed electrode increases, and the area C corresponds to the recovery of the charge Q and of the energy.

In FIG. 5, a first alternative of a third embodiment of the present invention may be seen, differing from the second embodiment illustrated in FIG. 2, in that the injection of the charge into a drop downstream from the fixed electrode and the removal of the charge of said drop upstream from the fixed electrode are carried out automatically without any control from the electronic system.

The device also includes a tilted plane 104, an insulated fixed electrode 106 positioned below the plane 104.

The plane is made in an electrically insulating material with high permittivity; this plane therefore electrically insulates the fixed electrode 106 from the drop 102, at least at the fixed electrode 106. This plane advantageously has a strongly hydrophobic surface and with low hysteresis, which enables reduction of losses by friction.

The device includes a first electrode 115 positioned upstream from the fixed electrode 106 in the direction of displacement of the drop 102, this electrode forms a portion of the plane 104 and is flush with the displacement surface of the drop, so that the drop comes into contact with the latter while it moves at its level. The first electrode 115, which forms a charging electrode, will be called an injection electrode since it is intended for injecting the charge into the drop.

The device includes a second electrode 116 positioned downstream from the fixed electrode 106 in the direction of displacement of the drop 102. This electrode also forms a portion of the plane 104 and is flush with the displacement surface of the drop, so that the drop comes into contact with the latter when it moves at its level. This second electrode, which forms a discharge electrode, will be called a removal electrode since it is intended for removing the charge from the drop.

The assembly formed by the fixed electrode 106, the plane 104 and the mobile drop 102 forms a capacitor with variable capacitance 114'.

With the injection electrode 115 and the removal electrode 116, it is possible to polarize the drop, and then respectively extract the charge of the drop by simple mechanical contact upon passing of the drop.

The electronic system 108 includes means for setting a bias voltage $U_{pol}$ between the fixed electrode 106 and the injection electrode 115, and a resistor 118 which closes the charge injection circuit. Any other charge storage or consumption device may be suitable.

We shall now explain the operation of this device.

The drop 102.1 moves along the plane 104 by gravity, this drop moves at an initial velocity Vi.

The capacitance of the capacitor 114' increases gradually as the drop moves closer to the fixed electrode 106.

When the drop comes into contact with the injection electrode 115, a determined charge Q is injected into the drop by the electronic system 110; upon injecting the charge, a current flows from the fixed electrode towards the injection electrode. The capacitance is substantially maximal.

The charge Q causes attraction between the drop 102.2 and the fixed electrode 106, which deforms and flattens along the plane 104. The capacitance is then maximal (since the facing surface is maximum because of the relationship (1)). The result is slowing-down of the drop. The drop however continues its movement along the plane 104, causing a decrease in the capacitance. The braking energy is converted into an electrical energy via an increase in electric potential (considering the relationships (2) and (3)) between the drop and the fixed electrode 106.

The drop 102.3 continues its travel and when it reaches the removal electrode 116, the capacitance formed by the drop and the fixed electrode 106 is minimum. The charge Q is removed from the drop when the drop comes into contact with the removal electrode 116, a current flows from the removal electrode 116 towards the fixed electrode. The energy associated with this charge is then either transferred directly towards a device requiring this energy or towards a storage area, for example a battery or a capacitance.

The position of the removal electrode is determined so that it corresponds to the location where the drop forms with the fixed electrode 106, a capacitor with minimum capacitance.

By means of this embodiment, the injection 115 and removal 116 electrodes fulfill the function of a detector of position of the drop, and also that of a switch by injecting and removing the charge.

In this embodiment, the electronic system may advantageously be simplified since it only utilizes the current of electrons collected on the removal electrode 116 and returned to the injection electrode 115. The electronic system therefore does not require any particular means for measuring the capacitance of the capacitor 114' and for injecting and removing the charge.

In FIG. 6A, a second alternative of the third embodiment according to the present invention may be seen, wherein the drops of liquid are moved under the action of pressure and no longer under the effect of gravity.

The device is supplied with drops of liquid by a reservoir 200.

This reservoir 200 is intended to supply the discharge pipe with a pressurized liquid/gas mixture, this reservoir may for example be formed by a water fall or by biphasic flow in a pipe, only one of the phases of which is electrically conducting.

The device includes a discharge channel 201. Similarly to the device of FIG. 5, an insulating fixed electrode 206 is positioned outside the channel 201, an injection electrode 215 is substantially positioned facing the fixed electrode 206 and forming a portion of the wall of the channel 201 and a removal electrode 216 is positioned downstream from the fixed electrode 206 in the direction of displacement of the drops 202 symbolized by the arrow 207.

When a drop moves in the channel 201, it comes into electric contact with the injection electrode 215 and then with the removal electrode 216.

In the illustrated example, the injection electrode 215 and the removal electrode 216 are both positioned on the same side of the axis of the channel 201, but it may be provided that the removal electrode 216 should be on the same side as the fixed electrode 206 or that it be formed by a complete ring.

In FIG. 6B, an enlarged view of another exemplary embodiment of the device of FIG. 6A may be seen, wherein the injection electrode is positioned just upstream from the fixed electrode, and the removal electrode is formed by a ring interior to the channel downstream from the fixed electrode.

Advantageously, the shape and the position of the electrode are such that there is breaking of the electric contact between the injection electrode and the liquid electrode at the moment when the capacitance formed by the liquid electrode and the insulated electrode is maximal.

The injection electrode may be slightly upstream from the insulated electrode and/or of reduced size relatively to that of the insulated electrode.

The electric contact is broken when the surfaces facing the insulated and liquid electrodes are maximal, i.e. when the capacitance between the liquid electrode and the insulating electrode is maximum.

Drops 202 move in the channel 201. The section of the channel is selected to that it may be considered that the gas separating two drops 202 cannot escape because of the wetting of the drops, the gas therefore actually exerting a thrust on the drops.

The device also includes an electronic system 208 capable of applying an electric potential $U_{pol}$ between the fixed electrode 206 and the injection electrode 215, and capable of injecting an electric charge into the drop 202. This same device is capable of removing the charge via the resistor 218, or any other device for storing or consuming the charge, between the injection electrode 215 and the removal electrode 216.

The assembly formed by the fixed electrode 206, the wall of the channel 201 and the drop 202 therefore forms a capacitor with variable capacitance 214.

The wall of the channel 201 is made in an electrically insulating material, and preferentially with high permittivity, therefore electrically insulating the fixed electrode 206 from the drop 202, at least at the fixed electrode 206. The wall of the channel 201 advantageously has a hydrophobic inner surface and with low wetting hysteresis, which allows reduction of friction losses.

We shall now explain the operation of this device.

A drop of water 202.1 arrives at the inlet of the channel 201. Under the effect of the thrust exerted by the pressure, the drop moves in the direction of the arrow 207, comes into contact with the injection electrode 215 and receives a charge Q by the flow of a current from the fixed electrode 206 towards the injection electrode 215, the capacitance of the capacitor 214 is therefore maximum. The drop 202.2 continues its movement while moving away from the fixed electrode 206. The capacitance of the capacitor 214 decreases while the potential difference between the fixed electrode 206 and the drop 202 increases at constant charge Q (relationship (2)), as well as the associated electric potential energy (relationship (3)).

The drop 202.3 then comes into contact with the removal electrode 216, to which it transfers the charge Q by the flow of a current from the removal electrode 216 towards the fixed electrode 206, the electric potential of which and therefore the associated energy have increased during the displacement. This energy is stored, for example in a battery, or directly sent to an application directly using this energy.

It is possible, by optimizing the bias voltage $U_{pol}$, to recover almost all the energy associated with the initial pressure of the mixture, i.e. the drops then having a quasi zero velocity at the removal electrode 216.

In FIG. 7, an exemplary source of drops of pressurized liquid adapted to the device of FIG. 6, may be seen, wherein it is desired to recover the energy from the combustion of a gas.

The combustion takes place in a closed chamber 220 including a ceiling 221 tilted in the direction of the channel 201, advantageously cooled, for example as this is illustrated by fins 222.

During the combustion, the combustion gases condense on the ceiling 221 and flow along the ceiling as far as the inlet of the channel 201, the condensation drops then penetrate into the channel and move in the latter in a similar way to that described in connection with FIG. 6. The pressure originates from the generation of the gases in the closed chamber 220.

It may be provided that the ceiling forms a plane 104 of a device as described in FIG. 2 or 5, which would allow an increase in the amount of recovered energy, the potential energy and then the pressure energy would be recovered.

Provision may also be made for having several recovery devices according to the invention in series, in order to recover all the energy if a single device was not sufficient.

It is well understood that it would be possible to provide replacement of the electrode 215 with a filament like in the second embodiment, in this case, the electronic system would have means for measuring the capacitance and means for managing the injection and removal of the charge.

In FIGS. 8 and 9, a third alternative embodiment of an energy recovery device according to the third embodiment of the present invention may be seen.

This device includes at least one fixed electrode 306 covered with a layer of dielectric material 309 and an injection electrode 315 facing the dielectric layer 309 delimiting a vertical air gap 310. The electrode 315 may have any shape, or even a point like shape; indeed, the latter only has an electric contact function. On the other hand, the electrode 306 advantageously has a surface, since it is this surface which allows an increase in the capacitance.

The device also includes a removal electrode 316 positioned downstream from the fixed electrode 306 in the vertical direction, and interposed in the path of the drops. In the illustrated example, the electrode is orthogonal to the falling direction of the drops.

An electronic system 308 capable of applying a bias voltage $U_{pol}$ between the fixed electrode 306 and the injection electrode 315 is provided. The electronic system is also intended to recover the charge Q and the electrical energy generated by conversion of mechanical energy.

This device may for example be used for recovering the falling energy of drops of rainwater 302. Advantageously and as this is illustrated in FIG. 8, the recovery device includes a plurality of fixed electrodes 306 facing injection electrodes 315 defining a plurality of air gaps thereby forming an electrostatic grid in order to increase the number of drops of water for which the energy is converted. Each fixed electrode 306 and each injection electrode 315 participate in two elementary devices.

The removal electrode 316 advantageously extends over the whole width of the electrostatic grid.

The assembly of the fixed electrode 306, dielectric layer 309 and drop 302 forms a capacitor with variable capacitance 314.

The position of the removal electrode 316 is determined so that it corresponds to the minimum capacitance of the capacitor 314.

We shall now explain the operation of such a device.

A drop of water 302 falls along the vertical direction towards the electrostatic grid, with an initial velocity $V_i$. When the drop crosses the grid, it comes into contact with the injection electrode 315 and receives a charge Q because of the potential difference $U_{pol}$ applied between the fixed electrode 306 and the injection electrode 315. The end of the injection of the charge Q substantially corresponds to the maximum value of the capacitance of the capacitor 314.

The drop continues its fall at a certain velocity towards the removal electrode 316 and emerges from the air gap 310 while retaining its charge Q. The capacitance of the capacitor 314 decreases gradually as the drop 302 moves away from the fixed electrode 306, while the electric potential of the charge increases (relationship (2)), as well as the electric potential energy (relationship (3)).

When the drop 302 comes into contact with the removal electrode 316, the latter removes the charge Q and the accumulated electrical energy.

The charge Q is then recovered in a capacitor 308 or any other means for storing or consuming the charge. A portion of the energy associated with this electric charge may however be used for charging for example a new drop 302. The excess energy, as for it, is stored or directly sent to an application for it to be used.

The device according to the present invention may operate when several drops simultaneously cross the electrostatic grid, and when they hit the removal electrode 316.

A single removal electrode 316 is required for recovering the electrical energy produced by a plurality of drops of water. But provision may be made for having several electrodes.

The removal electrode may include orifices for discharging the drops or a means for storing the latter.

Provision may be made for associating in series with the device of FIG. 8, a device of FIG. 2 or 5, in order to continue recovery of energy from the drops, the plane 104 for example forming an extension of the removal electrode 316.

It may be noted that, as the fixed electrode 306 is electrically insulated, the average current intended for maintaining the potential difference $U_{pol}$ is practically zero, the only current consumption being due to the leakage current. Therefore, with constant bias voltage, there is no electric consumption for maintaining the bias between the fixed electrode 306 and the injection electrode 315, except for the leakage current.

The selection of the value of $U_{pol}$ allows determination of the amount of recovered energy. Indeed, $U_{pol}$ imposes the value of the injected charge ($Q=U_{pol}/C_{max}$) and therefore the recovered energy ($E=1/2Q^2(1/C_{min}-1/C_{max})$).

Advantageously, the dielectric layer is hydrophobic, which allows the latter to remain dry.

We shall now give as an example, values of dimensions of such a device.

We consider a fixed electrode 306 of length $l=8.10^{-4}$ m and of width $L=10^{-3}$ m, a dielectric layer of thickness $e=3.10^{-6}$ m. The distance between a lower end of the fixed electrode 306 and the removal electrode 316 is designated by d. We shall determine the distance d for recovering a given amount of energy.

The drop of water has a volume of 3 mm³, i.e. a mass M of $10^{-6}$ kg and an initial velocity $V_i$ of 2 m/s.

Its kinetic energy is then equal to:

$$E_C = \frac{1}{2}MV_i^2 = \frac{1}{2}10^{-6} \cdot 2^2 = 2 \text{ μJ}.$$

It should be noted that the potential energy is small relatively to the kinetic energy.

In order to avoid that the drop remains blocked in the air gap 310 and knowing that part of the kinetic energy is dissipated by friction with the electrostatic grid, only half of the available energy, i.e. 1 μJ is intended to be recovered.

The maximum capacitance of the capacitor 314 is reached when the drop covers at best the fixed electrode 306 according to the relationship (1), $C_{max}$ is calculated with relationship (2). For the numerical application, Teflon® is used as a dielectric layer 309; $\epsilon_r$ of Teflon is equal to 2.1.

$$C_{max} = \frac{8.854 \cdot 10^{-12} \times 2.1 \times 10^{-3} \times 8.10^{-4}}{3.10^{-6}} = 7.4 \text{ pF}.$$

Moreover, knowing that the thickness of the Teflon® dielectric layer is $3.10^{-6}$ m and that its dielectric rigidity is 17 V/μm, we may theoretically apply a bias voltage $U_{pol}$ of 50V, but in order to avoid any risk of dielectric breakdown in air, we select an electric field of 3V/μm, i.e. a bias voltage $U_{pol}$ of 9V.

The maximum energy stored in the charge is then:

$$E_{Charge} = \frac{1}{2} C_{max} U_{pol}^2 = 0.3 \text{ nJ}.$$

the electric potential energy increases in inverse proportion with the capacitance of the capacitor 314.

The recovered energy at the removal electrode 316 is equal to the sum of the charge energy $E_{charge}$ and the energy which one wishes to recover $E_{recovered}$. Thus $$E_{recovered} + E_{Charge} = \frac{1 \text{ μJ} + 0.3 \text{ nJ}}{0.3 \text{ nJ}} \times E_{Charge},$$

hence $\frac{E_{recovered} + E_{Charge}}{E_{Charge}} = 3334 = \frac{C_{max}}{C_{min}} = \frac{d\epsilon_r}{3.10^{-6}}$ By using the relationship (3), knowing that Q is constant, $$d = \frac{3334}{\epsilon_r} \times 3.10^{-6} = 4.8 \text{ mm}$$

is obtained.

This action of moving away is accompanied by a voltage increase by a same ratio as that of the capacity change, the final voltage is therefore 30 kV. By choosing a bias voltage of 50 V, a final voltage of 5.5 kV would be obtained; it is therefore possible, by selecting an adequate geometry, or supposing different pressure or atmospheric conditions, to lower the final voltage.

In order to obtain the above change in capacitance, it is sufficient to place the removal electrode 316 relatively to the lower end of the fixed electrode 306 at a distance substantially equal to the calculated one d, to which is added the diameter of the drop.

The exemplary embodiments have been described while only considering one drop of liquid for purposes of simplicity, however it is well understood that each of the described devices is applied to energy recovery from a plurality of drops of liquid, for example in the device of FIG. 5, provision may be made for a parallel displacement of a plurality of the drops, the fixed electrode, the injection electrode and the removal electrode extending over the whole width of the tilted plane. In the device of FIG. 6, several channels fed by the same source may be provided.

A device 300 according to the present invention applied to recovering energy from waves for example from a sea, an ocean or a river, may be seen in FIG. 11.

In the illustrated example, the device is flush with the level of the water designated by M. A wave 307 is schematically illustrated with a trough and a crest. The device 300 includes a plurality of fixed electrodes 306 positioned, in the example, substantially vertically, defining channels between them. The fixed electrodes 306 are covered with a layer 309 of dielectric material.

A charge injection electrode 315 is provided at each fixed electrode 306. An electronic system 308 capable of applying an electric potential $U_{pol}$ between a fixed electrode 306 and the associated injection electrode 315 is also provided.

Electronic systems 308 are provided for each pair of fixed electrodes and injection electrode, or by group of pairs of fixed electrodes and injection electrode.

The electrode pairs 306-315 are intended to be actuated when they are covered with water, i.e. when they are submerged by a wave. Therefore, depending on the size of the waves, it is possible to choose either to individually control each pair, or to control groups for which the dimension corresponds to the size of the waves.

In the illustrated example, on the basis of the schematized wave, provision may be made for making two groups of six pairs.

The device 300 also includes an electric contact point 311 with water M.

Switching means 313 may be provided on the connection between the electronic system 308 and the contact point 311, allowing the system to be discharged when the capacitance of the system is minimum, i.e. the sea is at the low level. For this, the switching means include a device for detecting the presence of water, for example of the float type.

The wave forms a liquid electrode, which moves along the fixed electrodes, which modifies the facing surfaces and therefore the capacitance of the thereby formed capacitors.

The operation is similar to the operation described earlier:

When water comes into contact with one or more injection electrodes 315, a charge is injected into the water, a potential difference $U_{pol}$ is established between the water and the fixed electrode(s) 306. When the water withdraws, the voltage on the terminals of the system 308 increases because of the reduction of the capacitance of the capacitor formed between the fixed electrode(s) and the water.

Provision may be made for recovering the energy when the capacitance is minimum with the switching means 313, or when the capacitance is not minimum, in this case, the amount of recovered energy is not maximum, but the device provides more flexible operation.

Provision may be made for not using the electronic system 308 and for detecting when the capacitance is minimum or when the capacitance is maximum, the device then approaches the device of FIG. 1B as regards its operation.

The device is for example equipped with buoys and may be positioned in the high sea and may power insulated systems.

By means of the present invention, a device for converting mechanical energy into electrical energy has therefore been achieved, wherein the risks of contact between the electrodes are reduced, or even suppressed, while providing high recovery efficiency.

The invention claimed is:

1. An energy recovery device comprising:
   at least one capacitor with variable capacitance, the capacitor comprising a single fixed electrode, a dielectric layer, and at least one liquid electrode;
   a device, which includes an injection electrode that injects an electric charge into the liquid electrode and a removal electrode that removes an electric charge from the liquid electrode; and a mobile element positioned opposite to the fixed electrode relatively to the dielectric layer and capable of moving away from the fixed electrode and moving closer thereto, the liquid electrode being interposed between the dielectric layer and the mobile element, the liquid electrode being deformed by displacement of the mobile element.

2. The energy recovery device according to claim 1, wherein the mobile element is electrically conductive for injecting an electric charge into the liquid electrode and for removing an electric charge from the liquid electrode.

3. The energy recovery device according to claim 1, further comprising:
a fixed comb including fingers and forming the fixed electrodes and a mobile comb including fingers and forming a plurality of mobile elements interposed between the fingers of the fixed comb, the fingers of the fixed comb being covered with the dielectric layer, a liquid electrode being between a finger of the fixed comb and a finger of the mobile comb.

4. The energy recovery device according to claim 1, wherein the includes an electronic system that determines an instant when the capacitance of the capacitor is maximum and an instant when the capacitance is minimum, that controls injection and removal of the electric charge at these instants respectively.

5. The energy recovery device according to claim 1, wherein the dielectric layer has hydrophobic properties relative to the liquid electrode.

6. An energy recovery device comprising:
at least one capacitor with variable capacitance, the capacitor comprising a single fixed electrode, a dielectric layer, and at least one liquid electrode; and
a device, which includes an injection electrode that injects an electric charge into the liquid electrode and a removal electrode that removes an electric charge from the liquid electrode,
wherein the liquid electrode is mobile along a direction parallel to the fixed electrode, and
wherein the injection electrode is positioned upstream or facing the fixed electrode, and the removal electrode is positioned downstream from the fixed electrode.

7. The energy recovery device according to claim 6, wherein the device is connected through a conducting wire.

8. The energy recovery device according to the claim 7, further comprising:
a wall in a dielectric material, the fixed electrode on a first face of this wall, the liquid electrode being capable of moving on a second face opposite to the first face, and
wherein the devices includes a filament tensioned along the second face of the wall, an electronic system that determines an instant when the capacitance of the capacitor is maximum and an instant when the capacitance is minimum, and that controls injection and removal of the electric charge at these instants respectively.

9. The energy recovery device according to claim 6, further comprising:
a wall in a dielectric material, the fixed electrode on a first face of this wall, the liquid electrode being capable of moving on a second face opposite to the first face,
wherein the injection electrode forms a portion of the second face positioned upstream from the fixed electrode in the direction of displacement of the liquid electrode, and the removal electrode forms a portion of the second face positioned downstream from the fixed electrode in the direction of displacement of the liquid electrode.

10. The energy recovery device according to the claim 6, further comprising:

a wall in a dielectric material, the fixed electrode on a first face of this wall, the liquid electrode being capable of moving on a second face opposite to the first face,
wherein the mobile electrode moves under action of a pressure force and wherein the wall is cylindrical and forms a channel, the second face being the inner face of the channel, the injection electrode being substantially positioned at the fixed electrode or slightly upstream, so as to allow injection of the charge when the liquid electrode is facing the fixed electrode.

11. The energy recovery device according to claim 10, wherein the channel is configured to be connected to a source of pressurized drops of liquid, and the drops form the liquid electrodes.

12. The energy recovery device according to claim 6, wherein
the injection electrode is disposed substantially facing or slightly upstream from the fixed electrode covered with the dielectric layer, defining with the fixed electrode an air gap for letting through the liquid electrode, and the removal electrode is disposed downstream from the air gap in the direction of displacement of the liquid electrode.

13. The energy recovery device according to the claim 12, further comprising:
a plurality of injection electrodes and a plurality of fixed electrodes inserted between the injection electrodes forming a plurality of air gaps, the removal electrode extending substantially orthogonally to the direction of displacement of the mobile electrode and in front of the plurality of air gaps.

14. The energy recovery device according to claim 6, further comprising:
a wall in a dielectric material, the fixed electrode on a first face of this wall, the liquid electrode being capable of moving on a second face opposite to the first face,
wherein the injection electrode forms a portion of the second face positioned upstream from the fixed electrode in the direction of displacement of the liquid electrode, and the removal electrode forms a portion of the second face positioned downstream from the fixed electrode in the direction of displacement of the liquid electrode, and
wherein the position of the removal electrode relative to that of the fixed electrode is such that the capacitance of the capacitor is minimum when the liquid electrode is at the level of the removal electrode.

15. An energy recovery device comprising:
at least one capacitor with variable capacitance, the capacitor comprising a single fixed electrode, a dielectric layer, and at least one liquid electrode; and
a device, which includes an injection electrode that injects an electric charge into the liquid electrode and a removal electrode that removes an electric charge from the liquid electrode,
wherein the liquid electrode is mobile along a direction parallel to the fixed electrode, and
wherein the energy recovery device recovers energy of waves of an expanse of water, the waves forming the liquid electrode, including a plurality of fixed electrodes covered with a dielectric layer and positioned side by side defining passages for the waves, and a plurality of injection electrodes each associated with a fixed electrode positioned on the dielectric layer of the fixed electrode so that tops of the waves move away from the injection electrode and move closer thereto while moving along the fixed electrode, the removal electrode forming an electric contact point with the expanse of water, and wherein a position of the removal electrode relative to that of the fixed electrode is such that the capacitance of the capacitor is minimum when the liquid electrode is at a level of the removal electrode.

16. A method for recovering energy applying including at least one capacitor with variable capacitance, the capacitor including a single fixed electrode, a dielectric layer, and at least one liquid electrode, and a device for injecting an electric charge into the liquid electrode and removing and electric charge from the liquid electrode, the method comprising:

applying mechanical action of the liquid electrode so as to vary the capacitance between the liquid electrode and the fixed electrode;

measuring the capacitance of the capacitor and detecting instants when the capacitance is maximum and minimum;

injecting a charge in the liquid electrode when the value of the capacitance is maximum; and removing the charge form the liquid electrode when the value of the capacitance is minimum, and recovering the generated electrical energy, wherein the detecting the instant when the capacitance of the capacitor is maximum and the instant when the capacitance is minimum is obtained by injecting a residual charge into the capacitor and by measuring potential difference between the fixed electrode and the liquid electrode.

17. The method for converting mechanical energy into electrical energy according to claim 16, wherein the charge is injected when the drop is located upstream or substantially facing the fixed electrode and the charge is removed when the drop is located downstream from the fixed electrode.

18. A method for recovering energy applying including at least one capacitor with variable capacitance, the capacitor including a single fixed electrode, a dielectric layer, and at least one liquid electrode, and a device for injecting an electric charge into the liquid electrode and removing and electric charge from the liquid electrode, the method comprising:

applying mechanical action of the liquid electrode so as to vary the capacitance between the liquid electrode and the fixed electrode;

measuring the capacitance of the capacitor and detecting instants when the capacitance is maximum and minimum;

injecting a charge in the liquid electrode when the value of the capacitance is maximum;

removing the charge form the liquid electrode when the value of the capacitance is minimum, and recovering the generated electrical energy; and a preliminary selecting the bias voltage so that the velocity of the liquid electrode is close to zero at the removal electrode.

* * * * *